United States Patent [19]

Sherif et al.

[11] Patent Number: 4,487,632
[45] Date of Patent: Dec. 11, 1984

[54] FAST-SETTING CEMENTS FROM LIQUID WASTE PHOSPHORUS PENTOXIDE CONTAINING MATERIALS

[75] Inventors: Fawzy G. Sherif, Stony Point, N.Y.; Edwin S. Michaels, Fairfield, Conn.

[73] Assignee: Stauffer Chemical Company, Westport, Conn.

[21] Appl. No.: 522,133

[22] Filed: Aug. 11, 1983

[51] Int. Cl.³ .................................................. C04B 9/04
[52] U.S. Cl. ......................................... 106/85; 501/111
[58] Field of Search .................. 106/85; 501/111, 123, 501/125, 133, 155

[56] References Cited

U.S. PATENT DOCUMENTS

| | | | |
|---|---|---|---|
| 3,202,520 | 8/1965 | Enoch | 106/85 |
| 3,475,188 | 10/1969 | Woodhouse et al. | 106/105 |
| 3,525,632 | 8/1970 | Enoch | 106/85 |
| 3,673,111 | 6/1972 | Hovarth | 252/435 |
| 3,821,006 | 6/1974 | Schwartz | 106/85 |
| 3,879,209 | 4/1975 | Limes et al. | 501/111 |
| 4,059,455 | 11/1977 | Limes et al. | 106/85 |
| 4,152,167 | 5/1979 | Horvitz et al. | 106/85 |
| 4,174,227 | 11/1979 | Tomic | 106/85 |

*Primary Examiner*—James Poer
*Attorney, Agent, or Firm*—Hensley M. Flash

[57] ABSTRACT

A mixture capable of forming a fast-setting cement. The mixture comprises a liquid phosphorus pentoxide ($P_2O_5$) containing waste component and a solid component comprising at least one magnesium containing compound. This solid component, e.g., magnesium oxide, hydroxide, or carbonate is capable of reacting with the liquid waste to form a monolithic solid.

The liquid $P_2O_5$ containing waste is preferably spent phosphoric acid from the metal chemical polishing industry.

31 Claims, No Drawings

FAST-SETTING CEMENTS FROM LIQUID WASTE PHOSPHORUS PENTOXIDE CONTAINING MATERIALS

BACKGROUND OF THE INVENTION

1. Field of the Invention

This invention relates to fast-setting cementitious compositions. More particularly, it relates to fast-setting concrete cement compositions derived from liquid waste phosphorus pentoxide ($P_2O_5$) containing materials.

2. Related Art

Fast-setting cementitious compositions having utility for various purposes for which cements are employed have been heretofore known.

U.S. Pat. No. 3,202,520 (Enoch, Aug. 8, 1965) discloses a rapid set non-hygroscopic cement composition consisting essentially of a blend of a phosphate derived from phosphoric acid and of alumina, and containing from 15 to 55 weight percent of $P_2O_5$ and from 45 to 75 weight percent of alumina, and from 5 to 18 weight percent of magnesium oxide. The phosphoric acid is used in its liquid state then moisture is removed by drying the blend above 212° F.

U.S. Pat. No. 3,525,632 (Enoch, Aug. 25, 1970) discloses a rapid setting concrete cement composition which comprises dry blending magnesium containing compounds, aluminum containing compounds and phosphorus containing compounds from stated sources in stated weight percentages, and then pulverizing the blended material without a separate drying stage. The phosphorus containing compound is a mixture derived from phosphoric acid, and at least 50 weight percent of one of trimagnesium phosphate, aluminum orthophosphate, and phosphoric anhydride.

U.S. Pat. No. 3,879,209 (Limes et al., Apr. 22, 1975) discloses a process for making a fast-setting concrete comprising establishing a mixture of an aggregate, containing at least 10 percent by weight of magnesia, and ammonium phosphates in aqueous solution. This patent further discloses that a commercial (agriculture fertilizer) product known as sequestered phosphatic solution (SPS) is particularly suitable as the source of the ammonium phosphate. The ammonium component is an essential feature of this invention.

U.S. Pat. No. 4,059,455 (Limes et al., Nov. 22, 1977) discloses a process for making a fast-setting concrete comprising establishing a mixture of an aggregate, containing at least 1% magnesia, and ammonium phosphates in aqueous solution. Again, the ammonium component is essential for attainment of the desired results of the invention.

U.S. Pat. No. 4,174,227 (Tomic, Nov. 13, 1979) discloses a grouting system comprising an acidic reactive component comprising at least one acidic oxy phosphorus compound selected from phosphoric acids, anhydrides of phosphoric acids and salts of phosphoric acids with multivalent metal cations; and a basic reactive component comprising at least one basic metal compound of a Group II or Group III metal capable of reacting with the oxy phosphorus compound(s) in the presence of water to form a monolithic solid. This patent teaches that the monovalent salts of phosphoric acid, e.g., the ammonium phosphates, do not develop early pull strength.

U.S. Pat. No. 3,821,006 (Schwartz, June 28, 1974) discloses a patching composition consisting essentially of a reactive component of MgO with an acid phosphate salt and an inert aggregate component. The particle size of the inert aggregate component is related to the compressive strength of the cement formed at an early cure age.

The mixtures employed in the methods of the patents discussed above set and develop usable strength much more rapidly than conventional materials. Nonetheless each of these patents is limited (as discussed above) and therefore distinguishable from the mixtures and processes of the present invention in several ways.

A fast-setting cementitious composition in which the phosphorus pentoxide reactive component is a liquid would be advantageous in that this liquid material can be transported to the intended application site in a liquid, pre-measured state where it can then be combined with a reactive MgO component to form a monolithic solid without the necessity of adding an aqueous component. It would be even more advantageous to utilize a liquid waste material that heretofore has created significant disposal problems.

It is an object of the present invention to provide fast-setting cementitious compositions derived from liquid phosphorus pentoxide containing waste materials.

Other objects and advantages of the present invention are shown throughout the specification.

SUMMARY OF THE INVENTION

In accordance with the present invention a mixture capable of forming a fast-setting cement has now been discovered comprising: a liquid phosphorus pentoxide containing waste component; and a solid component comprising at least one magnesium containing compound, said solid component capable of reacting with said liquid waste to form a monolithic solid. The mixture can further be comprised of an aggregate. A preferred liquid phosphorus pentoxide containing waste component is spent phosphoric acid from the metal chemical polishing industry.

This invention further comprises a process for treating liquid phosphorus pentoxide containing waste. The steps of this process comprises blending the liquid phosphorus pentoxide containing waste with a solid component comprising at least one magnesium containing compound, said solid component capable of reacting with said liquid waste to form a fast-setting cement. This process can further include the step of blending an aggregate into the liquid waste and solid component blend.

DETAILED DESCRIPTION OF THE INVENTION

The present invention comprises the formation of a fast-setting cement when a mixture formulated in accordance with this invention is prepared. Generally, the fast-setting cement of this invention can be used for producing fast-setting concrete structures, e.g., structures suitable for roadway patches or other load-bearing uses, however in its broader aspects, the invention is generally applicable to preparing concrete structures with various characteristics, e.g., high or low strength, for a variety of other purposes as well. The characteristics of any particular concrete structures formed can depend upon the weight ratio of the various components, the nature of the aggregate employed, the temperature conditions of application and the curing conditions as well as other factors.

Fast-setting cement can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick permanent repair of concrete.

Fast-setting cement can be used for making various objects and as a fire-proof protective coating for various flammable substrates. The cement can also be used as an adhesive for wood, glass, metal and the like.

As a general rule, the setting time for fast-setting cement can range from a few seconds to a few hours. As a practical matter, the setting time must be sufficient to allow the mixture to be thoroughly blended together to form a non-collapsible putty and be applied to the intended area, whether a mold or a patch, prior to hardening into a monolithic solid. In quantitative terms, fast-setting means that the cement hardens in less than 30 minutes, usually in about 1 to 10 minutes, and reaches more than 500 psi of compression strength in usually less than 2 hours.

The mixture of the present invention comprises a liquid phosphorus pentoxide containing waste component and a solid component selected from at least one magnesium containing compound. The mixture can further comprise an aggregate.

The liquid $P_2O_5$ containing waste component can be selected from various industrial and agricultural liquid wastes, e.g., spent phosphoric acid from the metal chemical polishing industry (e.g., spent bright dip acid). A typical spent bright dip acid contains 27% $P_2O_5$ and other trace metal ions. The spent acid contains varying amounts of $Al^{+3}$ formed during the chemical cleaning and polishing of aluminum metal. These $Al^{+3}$ ions can improve the strength of the cement by forming a three dimensional polymeric network with the phosphate ions that are present in the cement.

Spent bright dip acid is the phosphoric acid waste resulting from the chemical polishing of aluminum process that is commonly used within the metal chemical polishing industry.

The liquid $P_2O_5$ containing waste component can usually be selected from most liquid waste materials containing free or available $P_2O_5$ and can contain from about 20% to about 40% by weight $P_2O_5$. This liquid $P_2O_5$ containing waste component can be comprised of various mixtures of liquid waste materials containing free or available $P_2O_5$. Other liquid wastes can include waste $H_3PO_4$ from various agricultural chemical production processes. The liquid waste can include the slurry resulting from phosphatizing steel and iron surfaces in the metal treatment and steel electropolishing industry.

The liquid waste material is mixed with a solid component. This solid component comprises at least one magnesium containing compound. These compounds must be capable of reacting with the liquid $P_2O_5$ containing waste component to form a monolithic solid. Such compounds include magnesium oxide, magnesium hydroxide, and magnesium carbonate. The solid component of the mixture must contain at least one of these listed compounds. Mixtures of these listed compounds can also be employed. The magnesium containing compounds can also be milled and classified to allow their particles to pass through 20 mesh and remain upon 325 mesh.

The molar ratio of $P_2O_5$ contained within the liquid waste component to the magnesium contained within the solid component can range from about 1:1 to about 1:20. Generally, there is no advantage to exceeding this ratio to any larger degree inasmuch as the cheaper aggregate can be used to increase the solids content of the overall concrete mixture without deleterious effect.

A particulate aggregate, preferably graded sand, can be included in the cement mixture in a controlled amount as a filler. Aggregate greatly enhance the strength of the hardened concrete cement. Other aggregate materials which can be used include particles of competent rocks or rock-forming minerals such as granite, basalt, dolomite, andesite, feldspars, amphiboles, pyroxenes, olivine, gabbro, rhyolite, syenite, diorite, dolerite, peridotite, trachyte, obsidian, quartz, etc., as well as materials such as slag, cinders, fly ash, glass cullet, and fibrous materials such as chopped metal wire (preferably steel), glass fibers, asbestos, cotton and polyester and aramide fibers. Aggregates having different particle shapes and sizes can be used. Mixtures of different aggregates can also be used.

This invention further comprises the process of blending the liquid $P_2O_5$ containing waste with a solid component comprising at least one magnesium containing compound, and optionally an aggregate, to form a fast-setting cement. This process provides a unique method that is economical as well as environmentally sound for treating liquid $P_2O_5$ containing wastes.

Water is usually a component of the liquid $P_2O_5$ containing waste. The water content of this waste can vary and therefore more water can be added as needed or alternatively more of the solid component, or alternatively the liquid $P_2O_5$ containing waste can be subjected to a pre-treating, evaporation step to ensure that the water content of the mixture is adequate. The amount of water present is important. Too much water can convert the mixture into a runny soup that may not set at all or may not set until substantial dehydration occurs; and, too little water will not wet the solid component sufficiently to allow the necessary chemical reaction. The optimum amount of water will depend upon the particular physical characteristics of the constituents of the mixture, e.g., absorbency, surface area, etc. However, the optimum amount of water present in the mixture must be sufficient to adequately wet the solid component and optional aggregate mixture to form a non-collapsible putty. This optimum amount of water can be determined on a mixture by mixture basis.

The various mixtures of this invention and the process of blending the constituents together result in the production of unique fast-setting cements.

The following Example illustrates an embodiment of the present invention but should not be construed in a limiting sense. The scope of protection sought is set forth in the claims which follow the Examples.

EXAMPLE 1

337.5 gms of construction sand and 112.5 gms of 98% commercial magnesium oxide were blended together then mixed with 100 gms of spent phosphoric acid from the metal chemical polishing industry (bright dip acid). The resulting slurry was poured into 2 inch cube molds.

The slurry hardened into a cement within 1 minute. The cement cubes formed could withstand 958 psi after 2 hours.

The cement cubes remained stable after being boiled in water for 2 hours. In the first hour, the pH of the water fell from 7.5 to 6.5 but thereafter remained at 6.5 indicating no further acid leaching.

EXAMPLE 2

60 gms of spent phosphoric acid from the metal cleaning industry (bright dip acid) was mixed with 240 gms of a dry mixture containing 25% MgO and 75% gravel. The slurry was poured into 2 inch cube molds. The compression strength was determined following ASTM C-109 method. An Instron Instrument was used to measure the compression strength of several cubes at different intervals from setting time. The results are summarized in Table I.

TABLE I

Compression Strength and Setting Time of Magnesium Phosphate Cements

| Sample No. | Set Time Mins. | Compression Strength Psi | Curing Time Hours |
|---|---|---|---|
| 1 | 2 | 1175 | 1 |
| 2 | 2 | 1125 | 2 |
| 3 | 2 | 1178 | 4 |
| 4 | 2 | 1928 | 24 |
| 5 | 2 | 3270 | 48 |

EXAMPLE 3

64 gms of spent bright dip acid was mixed with 71.6 gms of deadburn MgO and 215 gms of gravel. The slurry was poured into 2 inch cube molds. The setting time of triplicate experiments was 2 mins. for each sample. The compression strengths were 1000, 1025 and 1025 psi after 2 hours from mixing.

EXAMPLE 4

32 gms of spent bright dip acid was mixed with 32 gms of a 50% by weight monoaluminum phosphate solution, 71.6 gms of deadburn MgO and 215 gms gravel. The resulting slurry was poured into a 2 inch cube mold. It hardened in 8 mins. The compression strength was 2650 psi after 2 hours from mixing.

EXAMPLE 5

30 gms of spent bright dip acid was mixed with 30 gms of a 50% by weight monoaluminum phosphate solution and 240 gms of a dry mixture containing 25% by weight MgO and 75% by weight gravel. In duplicate experiments setting times were 1.5 and 2 mins. The compression strength was 3000 and 3250 psi respectively after 2 hours from mixing.

EXAMPLE 6

30 gms of spent bright dip acid was mixed with 30 gms of a 50% by weight ammonium phosphate solution and 240 gms of a dry mixture containing 25% by weight MgO and 75% by weight gravel. In duplicate experiments the setting time was 2.5 mins. for each sample. The compression strength was 1500 psi for each sample after 2 hours from mixing.

What is claimed is:

1. A mixture capable of forming a fast-setting cement comprising:
   (a) a liquid phosphorus pentoxide containing waste component; and
   (b) a solid component comprising at least one magnesium containing compound, said solid component capable of reacting with said liquid waste to form a monolithic solid.

2. The mixture of claim 1 further comprising an aggregate.

3. The mixture of claim 1 wherein the molar ratio of phosphorus pentoxide contained within said liquid waste component to the magnesium contained within said solid component ranges from about 1:1 to about 1:20.

4. The mixture of claim 1 wherein the liquid phosphorus pentoxide waste component is selected from industrial and agricultural wastes.

5. The mixture of claim 1 wherein the liquid phosphorus pentoxide waste component is spent phosphoric acid from the metal chemical polishing industry.

6. The mixture of claim 5 wherein the spent liquid phosphoric acid contains from about 20% to about 40% by weight phosphorus pentoxide.

7. The mixture of claim 1 wherein the liquid phosphorus pentoxide waste component is spent phosphoric acid from the iron phosphatizing industry.

8. The mixture of claim 1 wherein the liquid phosphorus pentoxide waste component is spent phosphoric acid from the electropolishing industry.

9. The mixture of claim 1 wherein the magnesium containing compound is magnesium oxide, hydroxide, carbonate, or mixtures thereof.

10. The mixture of claim 2 wherein the liquid phosphorus pentoxide waste component is selected from industrial and agricultural wastes.

11. The mixture of claim 2 wherein the liquid phosphorus pentoxide waste component is spent phosphoric acid from the metal chemical polishing industry.

12. The mixture of claim 11 wherein the spent liquid phosphoric acid contains from about 20% to about 40% by weight phosphorus pentoxide.

13. The dry blend of claim 2 wherein the magnesium containing compound is magnesium oxide, hydroxide, carbonate, or mixture thereof.

14. A process for treating liquid phosphorus pentoxide containing waste comprising blending said liquid phosphorus pentoxide containing waste with a solid component comprising at least one magnesium containing compound, said solid component capable of reacting with said liquid waste to form a fast-setting cement.

15. The process of claim 14 further comprising the step of blending an aggregate into the liquid waste and solid component blend.

16. The process of claim 14 wherein the molar ratio of phosphorus pentoxide contained within said liquid waste to the magnesium contained within said solid component ranges from about 1:1 to about 1:20.

17. The process of claim 14 wherein the liquid phosphorus pentoxide waste is spent phosphoric acid from the metal chemical polishing industry.

18. The process of claim 17 wherein the spent liquid phosphoric acid contains from about 20% to about 40% by weight phosphorus pentoxide.

19. The process of claim 14 wherein the solid component is magnesium oxide, hydroxide, carbonate, or mixtures thereof.

20. The process of claim 15 wherein the liquid phosphorus pentoxide waste is spent phosphoric acid from the metal chemical polishing industry.

21. The process of claim 20 wherein the spent liquid phosphoric acid contains from about 20% to about 40% by weight phosphorus pentoxide.

22. The process of claim 15 wherein the solid component is magnesium oxide, hydroxide, carbonate, or mixtures thereof.
23. The fast-setting cement resulting from the process of claim 14.
24. The fast-setting cement resulting from the process of claim 15.
25. The fast-setting cement resulting from the process of claim 16.
26. The fast-setting cement resulting from the process of claim 17.
27. The fast-setting cement resulting from the process of claim 18.
28. The fast-setting cement resulting from the process of claim 19.
29. The fast-setting cement resulting from the process of claim 20.
30. The fast-setting cement resulting from the process of claim 21.
31. The fast setting cement resulting from the process of claim 22.

* * * * *